(12) United States Patent
Vigneron et al.

(10) Patent No.: US 8,893,504 B2
(45) Date of Patent: Nov. 25, 2014

(54) IGNITER

(75) Inventors: Basile Vigneron, Bristol (GB); Richard J. Tunstall, Bristol (GB)

(73) Assignee: Rolls-Royce PLC, London (GB)

( * ) Notice: Subject to any disclaimer, the term of this patent is extended or adjusted under 35 U.S.C. 154(b) by 695 days.

(21) Appl. No.: 13/225,996

(22) Filed: Sep. 6, 2011

(65) Prior Publication Data

US 2012/0227413 A1  Sep. 13, 2012

(30) Foreign Application Priority Data

Oct. 1, 2010  (GB) .................................. 1016481.2

(51) Int. Cl.
| | |
|---|---|
| *F02C 7/264* | (2006.01) |
| *F02C 1/06* | (2006.01) |
| *F02C 3/04* | (2006.01) |
| *F23Q 13/00* | (2006.01) |
| *F23R 3/16* | (2006.01) |
| *F23R 3/20* | (2006.01) |
| *F23R 3/34* | (2006.01) |

(52) U.S. Cl.
CPC ................ *F23Q 13/00* (2013.01); *F02C 7/264* (2013.01); *F23R 3/16* (2013.01); *F23R 3/20* (2013.01); *F23R 3/343* (2013.01); *F23D 2900/00014* (2013.01)
USPC ............ 60/776; 60/805; 60/39.17; 60/39.824

(58) Field of Classification Search
CPC ............. F02K 3/10; F02K 7/02; F02K 7/075; F02C 7/264; F23C 15/00; F23D 2900/00014; F23R 3/16; F23R 3/20; F23R 3/343; F23Q 13/00

USPC ........... 60/761, 765, 776, 805, 39.17, 39.821, 60/39.824
See application file for complete search history.

(56) References Cited

U.S. PATENT DOCUMENTS

| | | | |
|---|---|---|---|
| 2,692,480 A | | 10/1954 | Viaud et al. |
| 3,423,942 A | * | 1/1969 | Spindler .......................... 60/761 |
| 5,588,299 A | * | 12/1996 | DeFreitas .................. 60/39.826 |

(Continued)

FOREIGN PATENT DOCUMENTS

| | | |
|---|---|---|
| DE | 17 51 990 C1 | 5/1979 |
| FR | 1.008.660 | 5/1952 |

(Continued)

OTHER PUBLICATIONS

Search Report for Great Britain Patent Application No. GB 1016481.2 with a search date Jan. 26, 2011.

(Continued)

*Primary Examiner* — J. Gregory Pickett
(74) *Attorney, Agent, or Firm* — Oliff PLC

(57) ABSTRACT

An igniter arranged to ignite combustion in a primary flow including a fuel and air mixture, the igniter including one or more geometric features arranged to: induce a shockwave flow structure at least partially disposed in the primary flow; and ignite the fuel and air mixture by virtue of the shockwave flow structure. The present disclosure also relates to a method of igniting combustion in a primary flow including a fuel and air mixture, the method including: providing one or more geometric features arranged to induce a shockwave flow structure; inducing the shockwave flow structure at least partially in the primary flow; and igniting the fuel and air mixture by virtue of the shockwave flow structure.

16 Claims, 5 Drawing Sheets

(56) References Cited

U.S. PATENT DOCUMENTS

| | | | |
|---|---|---|---|
| 5,685,142 A * | 11/1997 | Brewer et al. | 60/39.821 |
| 7,013,634 B2 * | 3/2006 | Pidcock et al. | 60/39.821 |
| 7,096,670 B2 * | 8/2006 | Joos et al. | 60/39.821 |
| 2005/0160717 A1 | 7/2005 | Sprouse et al. | |
| 2005/0221245 A1 | 10/2005 | Elvander et al. | |

FOREIGN PATENT DOCUMENTS

| | | |
|---|---|---|
| GB | 1 350 115 | 10/1971 |
| GB | 2 409 025 A | 6/2005 |
| JP | A-56-032057 | 4/1981 |
| JP | A-06-272618 | 9/1994 |

OTHER PUBLICATIONS

European Search Report dated Jan. 23, 2012 in European Patent Application No. 11 18 0115.

* cited by examiner

IGNITER

This disclosure relates to an igniter and particularly but not exclusively relates to an igniter for a gas turbine combustion chamber or reheater.

BACKGROUND

A combustor, for example a reheat combustor, in a gas turbine engine may typically comprise the arrangement shown in FIG. 1. The combustor may comprise one or more gutters 10, which create a stagnation zone 12 in the flow 11. The gutters 10 may enable the flow to have a large residence time in the low velocity stagnation zone 12. Combustion may occur under such conditions because the rate of mixing (eg due to turbulent eddies) is low. The combustion reaction may then propagate downstream to the surrounding flow 14 by diffusion. Combustion is therefore created in a low velocity area that propagates in the flow and the combustion sustained and protected from extinction by the gutter.

However, a disadvantage of the prior art arrangement shown in FIG. 1 is that a spark or a fuel plug (not shown) is required to ignite the combustion. An electrical system or a burning plug of fuel is thus required and such systems add undesirable complexity.

A further problem with the prior art arrangement is the high drag introduced by the gutters in a region where the pressure losses must be minimised. For example, pressure losses in the reheat section have an adverse effect on the thrust and/or efficiency. Pressure losses are already introduced by reheating the flow, so it is desirable to avoid further pressure losses.

The present disclosure therefore seeks to address these issues.

STATEMENTS OF INVENTION

According to a first aspect of the present disclosure there is provided an igniter arranged to ignite combustion in a primary flow comprising a fuel and air mixture, the igniter comprising one or more geometric features including a convergent-divergent nozzle, the one or more geometric features being arranged to: induce a shockwave flow structure at least partially disposed in the primary flow; and ignite the fuel and air mixture by virtue of the shockwave flow structure characterised in that the convergent-divergent nozzle is configured to deliver a secondary flow through the convergent-divergent nozzle to the primary flow, wherein in use the shockwave structure resides at least partially in the primary flow.

The sudden changes in temperature and/or pressure associated with the shockwaves may ignite the fuel and air mixture. Thus, the igniter disclosed herein may not require an electrical spark or fuel plug and may only require a geometrical feature in order to ignite the primary flow.

The secondary flow may mix with the primary flow with the shockwave structure residing at least partially in the primary flow. The secondary flow may comprise a bleed flow, for example a bleed flow from a compressor stage, eg in a gas turbine engine.

Fuel, eg kerosene, may be injected into the primary flow upstream of the convergent-divergent nozzle exit. Fuel may alternatively or additionally be injected into the convergent-divergent nozzle.

The one or more geometric features may additionally comprise a sharp edge or point arranged to induce the shockwave flow structure. For example, the geometric features may comprise a cone-shaped structure with the tip of the cone facing the flow at the outlet of the convergent-divergent nozzle. The sharp edge or point may generate an initial shockwave, eg a standing or bow shockwave, emanating from the tip of the sharp edge or point. The shockwave may form part of the shockwave flow structure. The remainder of the shockwave flow structure may occur downstream of the shockwave, eg in the primary flow. The sharp edge or point may be provided at or towards the end of the divergent section of the convergent-divergent nozzle.

The convergent-divergent nozzle may comprise a first divergent portion and a second divergent portion downstream in use of the first divergent portion. The second divergent portion may be divergent to a greater extent than the first divergent portion, and the sharp edge may be located between the first and second divergent portions.

A combustion chamber may comprise the aforementioned igniter. The combustion chamber may comprise a plurality of such igniters. The combustion chamber may further comprise a duct. The igniters may be circumferentially disposed about the duct, eg on a sidewall of the duct. The plurality of igniters may be arranged to direct a secondary flow from the igniters towards a centreline of the duct.

A gas turbine may comprise the aforementioned igniter or the aforementioned combustion chamber. A reheat system may comprise the aforementioned igniter or the aforementioned combustion chamber.

According to a second aspect of the present disclosure there is provided a method of igniting combustion in a primary flow comprising a fuel and air mixture, the method comprising:
providing one or more geometric features including a convergent-divergent nozzle, the one or more geometric features being arranged to induce a shockwave flow structure; providing a secondary flow through the igniter;
mixing the secondary flow with the primary flow;
inducing the shockwave flow structure at least partially in the primary flow; and
igniting the fuel and air mixture by virtue of the shockwave flow structure.

The method may further comprise: providing a convergent-divergent nozzle; and inducing the shockwave flow structure by virtue of the convergent-divergent nozzle.

BRIEF DESCRIPTION OF THE DRAWINGS

For a better understanding of the present disclosure, and to show more clearly how it may be carried into effect, reference will now be made, by way of example, to the accompanying drawings, in which:—

DETAILED DESCRIPTION

Figure 1:
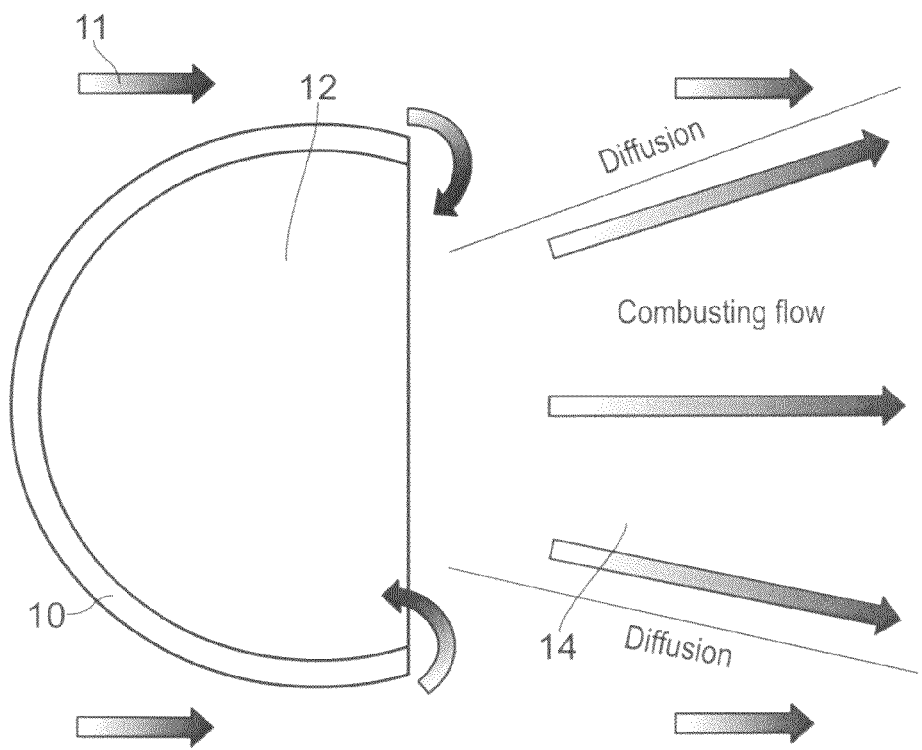
FIG. 1 shows a prior art arrangement of a reheat system.
Figure 2:
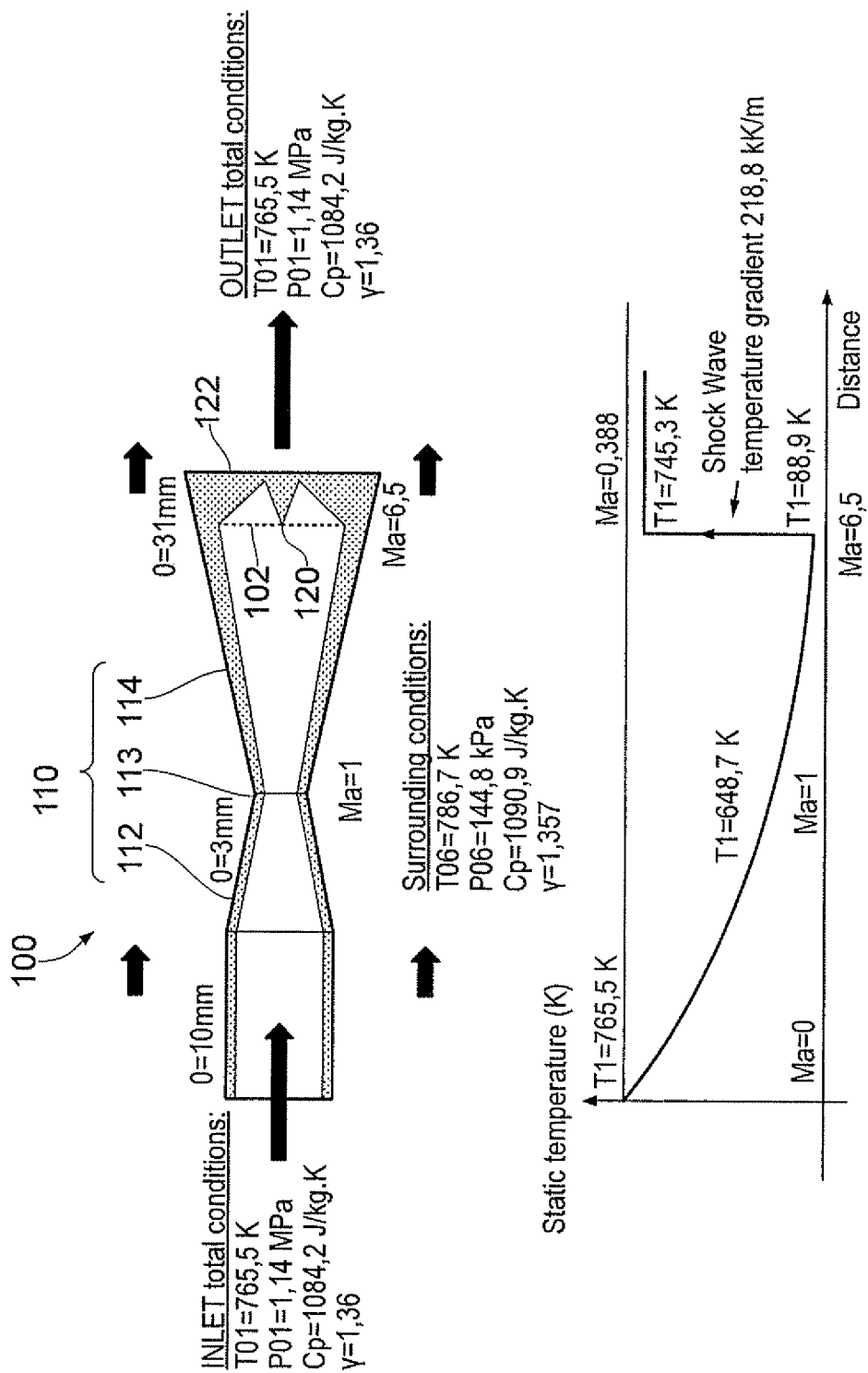
FIG. 2 shows an igniter according to a first example of the present disclosure and illustrates the principle behind the present disclosure.

With reference to FIG. 2, an igniter 100 according to a first example of the present disclosure comprises one or more geometric features arranged to induce a shockwave flow structure 102. For example, a first geometric feature may comprise a convergent-divergent nozzle 110, which may induce a shockwave in the divergent portion 114. In operation, flow at the throat 113 between the convergent portion 112 and the divergent portion 114 of the convergent-divergent nozzle 110 may be choked. A valve (not shown) may be provided upstream of the convergent-divergent nozzle 110 to ensure the mass flow through the convergent-divergent nozzle is sufficient to induce the shockwave 102. The flow is accelerated along the divergent portion 114 at supersonic conditions to create favourable conditions for a shockwave to occur.

The flow in the convergent-divergent nozzle 110 may comprise a fuel and air mixture. For example, the fuel, which may or may not be vaporised, may be mixed into a flow of air upstream of the convergent portion 112. Alternatively, the fuel may be added downstream of the convergent portion 112, eg in the divergent portion 114 or at the throat 113. As will be described with respect to the third example of the present disclosure, the fuel may be added to the flow of air downstream of the divergent portion 114. With such an arrangement, the fuel and air mixture may not be ignited by the leading shockwave 102, but by subsequent downstream shockwaves or pressure gradients, eg reflected shockwaves or other waves of pressure and/or temperature.

A second geometric feature may also be provided. The second geometric feature may comprise a sharp edge or point 120 or any other geometric feature which may induce a shockwave in a supersonic flow. For example, as shown in FIG. 2, the second geometric feature may comprise a knife edge or the tip of a cone. The second geometric feature may be provided downstream of the throat 113 of the convergent-divergent nozzle. The sharp edge or point 120 may be held in place by one or more support members 122, which may attach the sharp edge or point to a wall of the convergent-divergent nozzle. The support members 122 may be spaced apart to permit flow between the wall of the convergent-divergent nozzle and the sharp edge or point 120. The shockwave flow structure 102 may be induced by the sharp edge or point 120 and may emanate from the sharp edge or point 120.

The sharp edge or point 120 mounted at the outlet of the igniter 100 may create a stagnation point and may also create the necessary conditions for a shockwave to occur. The flow conditions, for example temperature and pressure, change sharply through the shockwave 102. Such a thermal gradient may be sharp enough to trigger combustion.

By way of example, FIG. 2 also shows a temperature profile through an example of the convergent-divergent nozzle 110. The flow conditions through a normal shock wave are derived from the conservation statements for a perfect gas. As shown below, the downstream static temperature ($T_{post-shock}$) and Mach number ($Ma_{post-shock}$) are related to the upstream, ie pre-shock, Mach number ($M_{pre-shock}$) and the ratio of specific heat capacities ($\gamma$):

$$\frac{T_{post-shock}}{T_{pre-shock}} = \frac{(2Ma_{pre-shock}^2 - (\gamma - 1))((\gamma - 1)Ma_{pre-shock}^2 + 2))}{(Ma_{pre-shock}(\gamma + 1))^2}$$

$$Ma_{post-shock} = \sqrt{\frac{(\gamma - 1)M_{pre-shock}^2 + 2}{2\gamma M_{pre-shock}^2 - (\gamma - 1)}}$$

Applying these equations to the flow of gas and fuel in the convergent-divergent nozzle 110, the temperature gradient at the shockwave 102 is estimated to be approximately 218,800 Kelvin per meter (K/m). The perturbation introduced by the shockwave may thus be sufficient to ignite combustion. This example is developed based on a set of engine flow conditions and dimensions, which are shown in FIG. 2. However, these conditions and dimensions are an example only and other engine operating conditions and/or dimensions may be used.

Figure 3:
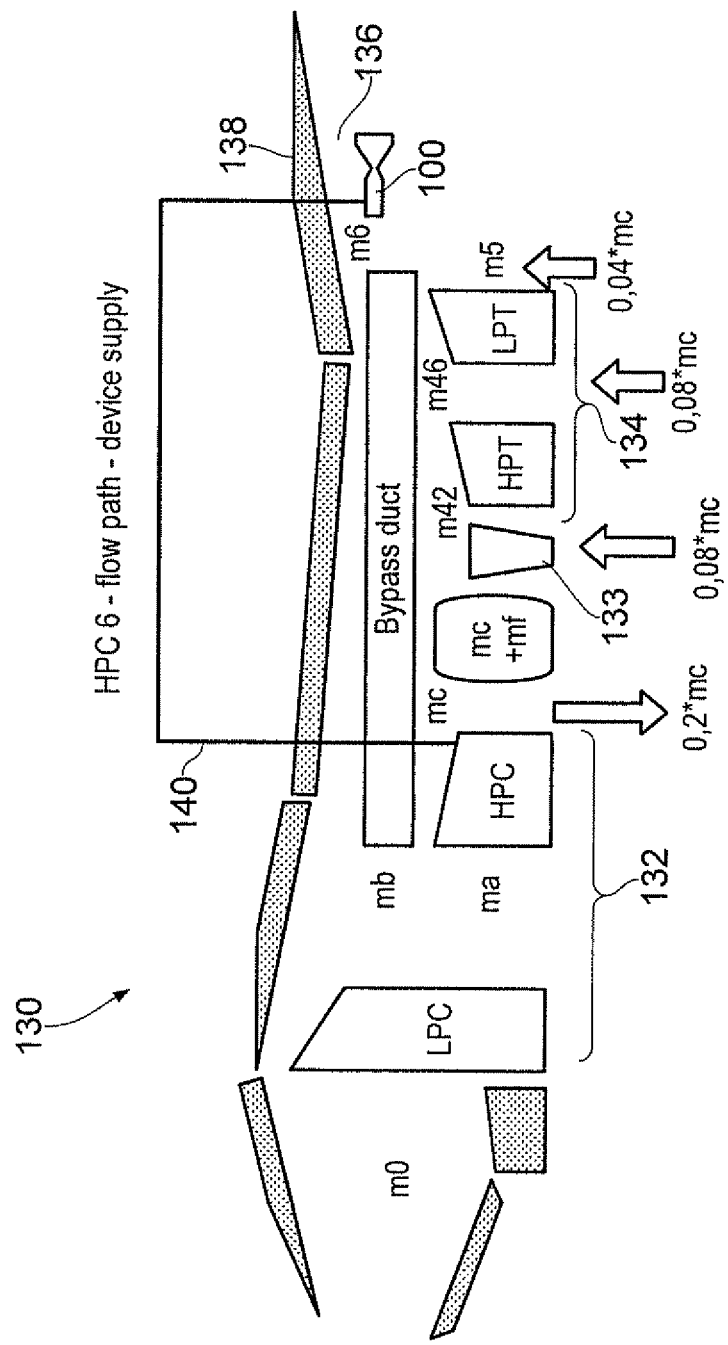
FIG. 3 shows a partial view of a gas turbine comprising the igniter according to a second example of the present disclosure.

With reference to FIG. 3, the igniter 100, according to a second example of the present disclosure, may be disposed downstream of a turbine section 134 of a gas turbine engine 130. For example, the igniter 100 may be provided in a reheat or after-burn section 136 of a jet engine, although in an alternative arrangement (not shown) the igniter may be provided in the combustion chamber 133 between the compressor section 132 and turbine section 134.

The igniter 100 of the second example may be similar to the igniter of the first example of the present disclosure in that the igniter may comprise one or more shock inducing geometric features. However, the igniter 100 of the second example of the present disclosure may be provided with a secondary flow. For example, the convergent-divergent nozzle may be configured to deliver the secondary flow through the convergent-divergent nozzle to the primary flow, and mix with a primary flow on exit from the igniter, such that the shockwave structure resides at least partially in the primary flow. The primary flow exiting from the turbine section 134 may flow around the igniter 100. The secondary flow from the compressor section 132 may be fed into the igniter 100 and join the primary flow on exit from the igniter. The secondary flow may comprise a mixture of fuel and air. In other words, fuel may be added to the secondary flow before or within the igniter. Alternatively, the primary flow may comprise a mixture of air and fuel and the shockwave structure downstream of the igniter may ignite the fuel and air mixture.

In the example shown in FIG. 3, the secondary flow into the igniter may be supplied from a bleed air 140 from the compressor section 132, eg a High Pressure Compressor (HPC). For example, as shown in FIG. 3, the bleed air 140 may be taken from a sixth stage of the HPC. Although this bleed air from the primary air system may represent a loss in engine efficiency, this may be more than offset by the reduction in the pressure loss across the igniter disclosed herein and the associated increase in engine efficiency. Furthermore, by bleeding flow from the HPC, the highest possible pressure, eg total pressure, may be presented to the igniter. A high pressure gradient across the convergent-divergent nozzle may ensure that the shockwave flow structure may occur.

As shown, the igniter 100 may be located within a duct 138, for example forming the reheat section 136. One or more igniters 100 may be provided in the duct 138 and the igniters may be circumferentially distributed about the duct. The igniter 100 may be orientated axially with respect to the centre line of the gas turbine 130, for example so that the flow leaving the igniter leaves in a substantially axial direction. However, with the configuration shown in FIG. 3 it may be difficult to maintain combustion due to the high level of turbulence in the post-shock region. A third example of the present disclosure may address this issue.

Referring to FIG. 4, the third example of the present disclosure is shown. The igniter 100 of the third example is similar to the igniters of the first and second examples, for example it may comprise one or more geometric features, such as a convergent-divergent nozzle and/or a sharp edge or point to trigger a shockwave flow structure. Furthermore, the igniter of the third example of the present disclosure is arranged in a similar fashion to the igniter of the second example in that the igniter is located within a duct 138 and is fed with a secondary flow, eg from the HPC. However, the third example differs from the second example in that the igniter 100 is orientated in a radial plane. In this configuration, the igniter 100 points towards the centreline 131 of the engine 130 such that the flow leaving the igniter 100 may have a velocity component in the radial direction. As for the second example, one or more igniters may be provided in the duct 138 and they may be circumferentially distributed about the duct.

Figure 4A:
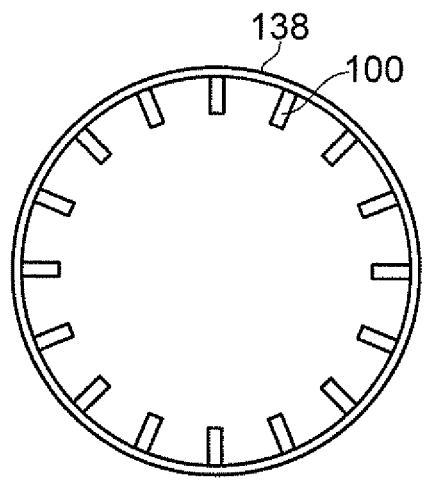
FIG. 4 shows an igniter according to a third example of the present disclosure with FIG. 4(a) showing a sectional view of the igniter in the radial plane and FIG. 4(b) showing a partial sectional view in the longitudinal plane.

With either of the second or third examples of the present disclosure, the number of igniters may depend on the total mass flow extractable from the HPC, for example because extracting air from the HPC may come at the expense of the overall engine efficiency. With the example flow conditions shown in FIG. 2, the maximum extractable mass flow from the HPC may be 1.5% of the mass flow entering the combustion chamber (eg approximately 0.23 kg/s). The mass flow required to provide flow conditions favourable for setting up a shockwave flow structure (eg choke the nozzle) for the convergent-divergent nozzle 110 with the dimensions shown in FIG. 2 may be 0.0144 kg/s. It may therefore be desirable to have 16 igniters as depicted in FIG. 4(a).

Figure 4B:
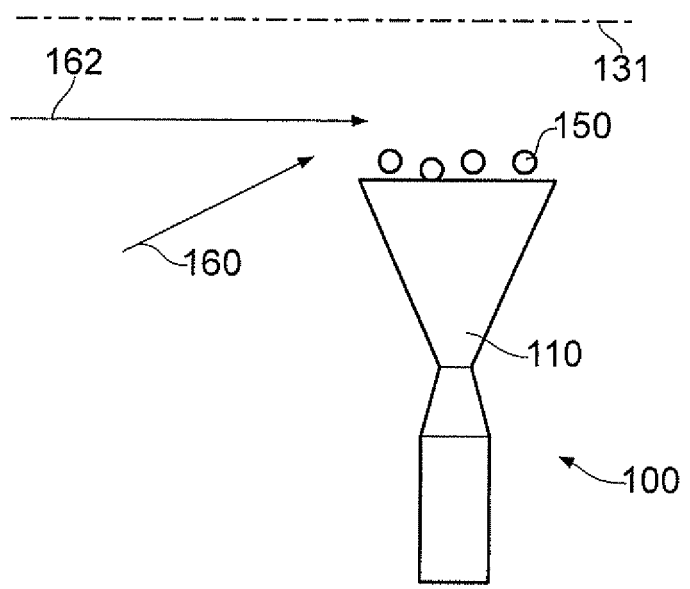

As shown in FIG. 4(b), ignition pockets 150 may be present at the outlet of the igniter 100. These ignition pockets may be localised regions with high temperature and/or pressure gradients and may be caused by the shockwave flow structure downstream of an initial shockwave in the igniter 100. As represented by arrow 160, fuel may be sprayed into the primary flow (represented by arrow 162) upstream of the igniter 100 (eg just before the shockwave flow structure location), so that the subsequent mixture of fuel and air may enter the zone with the ignition pockets 150. The mixture of fuel and air may then be lit and propagate downstream and towards the engine centreline due to the angle of the fuel spray. Having the igniters pointing towards the centreline 131 of the engine favours a configuration in which fuel may be sprayed upstream of the igniter. Furthermore, this arrangement may then enable the primary flow to be reheated as homogeneously as possible. The combustion may still occur at the outlet of the igniter, but this time the ignition pockets 150 are used as "sparks" to ignite the fuel sprayed upstream.

The igniter arrangement according to the third example of the present disclosure may prevent fuel from burning upstream of the igniters and may also help propagate the combustion downstream to the surrounding flow. However, it may be important to sustain combustion and turbulence downstream of the shockwave (which may have a high intensity) may extinguish the ignition pockets. This leads to a variant of the third example in which the sharp edge or point 120 may be omitted from the convergent-divergent nozzle 110 such that the flow may accelerate until it reaches the end of the divergent portion 114. A shockwave may then occur across the duct, eg substantially perpendicular to the engine centreline 131. Each of the igniters may contribute to the shockwave flow structure. Having the shockwave facing the direction of the primary flow in the duct may enable good mixing with the surrounding flow and may assist the direct propagation of the combustion (via shear flows) in the surrounding flow. Furthermore, omitting the sharp edge or point 120 further simplifies the igniter and avoids the need for heat resistant materials for the sharp edge or point and any associated supports 122.

Figure 5:
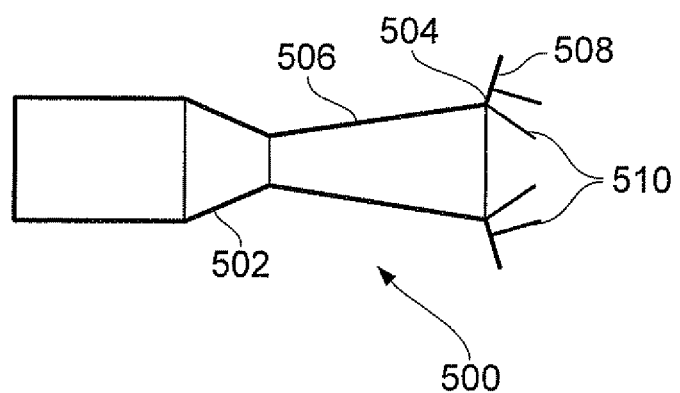
FIG. 5 shows an igniter according to a fourth example of the present disclosure.

Referring to FIG. 5, the fourth example of the present invention is shown. An igniter 500 includes a convergent-divergent nozzle 502. The convergent-divergent nozzle 502 comprises first a first divergent portion 506 and a second divergent portion 508 downstream in use of the first divergent portion 506. The second diverging portion 508 diverges outwardly to a greater extent than the first diverging portion 506 to define a sharp edge 504 located between the first 506 and second 508 divergent portions. In use, a shock wave flow structure is generated at region 510. In the igniter 500, the region 510 is at least partly located downstream of the convergent-divergent nozzle 502. As a result, the air-fuel mixture is ignited downstream of the igniter 500, which may lead to lower temperatures within the igniter 500 when operated, compared to the temperatures in igniter 100. Such lower temperatures may permit the use of less expensive materials for the igniter, or may result in longer component life.

Examples of the present disclosure may ignite combustion using the sharp perturbation and temperature gradient resulting from a shockwave flow structure. The shockwave flow structure may be formed by one or more of the above-mentioned geometric features, eg the convergent-divergent nozzle and/or the sharp edge or point. Piping air from the High Pressure Compressor (HPC) may further provide the necessary pressure gradient to generate a supersonic flow. As a result of the present disclosure, the "spark" is now a mechanical and reliable feature with no moving parts. The present disclosure therefore provides a passive ignition system for a combustion chamber or reheat system.

Other advantages of the present disclosure include the provision of a passive ignition system which may be matched to any HPC conditions, for example by adjusting a throttle diameter of the convergent-divergent nozzle or the valve upstream of the igniter. However, in the case of an igniter being used in a reheat system, the HPC will typically be operating close to its maximum rating when reheat is required. The igniter may therefore be matched to this operating condition.

The present disclosure may further provide an igniter that presents less drag to the flow and therefore minimises any pressure drops. In the case of a jet engine a higher thrust may thus be provided, or in the case of a gas turbine a higher power output from a working turbine may be achieved. In either case a higher engine efficiency may result from the igniters of the present disclosure.

Examples of the present disclosure may also be cheap to manufacture and may be applied to other combustion applications, for example, petrol piston engines. In such an application a small portion of the air used in the turbocharger may provide the secondary flow into the igniter.

The invention claimed is:

1. An igniter arranged to ignite combustion in a primary flow including a fuel and air mixture, the igniter comprising:
   one or more geometric features including a convergent-divergent nozzle, the one or more geometric features being arranged to:
   induce a shockwave flow structure at least partially disposed in the primary flow; and
   ignite the fuel and air mixture based on a presence of the shockwave flow structure,
   wherein: (i) the convergent-divergent nozzle is configured to provide a secondary flow through the convergent-divergent nozzle to the primary flow, (ii) in use, the secondary flow through the convergent-divergent nozzle is separate from the primary flow, and (iii) the shockwave structure resides at least partially in the primary flow.

2. The igniter as claimed in claim 1, wherein the one or more geometric features include a sharp edge or point arranged to induce the shockwave flow structure.

3. The igniter as claimed in claim 2, wherein the sharp edge or point is provided at or towards the end of the divergent section of the convergent-divergent nozzle.

4. The igniter as claimed in claim 2, wherein the convergent-divergent nozzle includes a first divergent portion and a second divergent portion downstream in use of the first divergent portion, the second divergent portion being divergent to a greater extent than the first divergent portion, and the sharp edge being located between the first and second divergent portions.

5. The igniter as in claim 1, wherein the shockwave flow structure includes a region of high temperature gradient.

6. A combustion chamber comprising the igniter of claim 1.

7. The combustion chamber of claim 6, wherein the combustion chamber includes a plurality of such igniters.

8. The combustion chamber of claim 7 further comprising: a duct and wherein the igniters are circumferentially disposed about the duct.

9. The combustion chamber of claim 8, wherein the plurality of igniters is arranged to direct the secondary flow from the igniters towards a centreline of the duct.

10. A gas turbine comprising the igniter of claim 1.

11. A gas turbine comprising the combustion chamber of claim 6.

12. A reheat system comprising the igniter of claim 1.

13. A reheat system comprising the combustion chamber of claim 6.

14. A method of igniting combustion in a primary flow including a fuel and air mixture, the method comprising:
   providing one or more geometric features including a convergent-divergent nozzle, the one or more geometric features being arranged to induce a shockwave flow structure;
   providing a secondary flow through the convergent-divergent nozzle, the secondary flow through the convergent-divergent nozzle being separate from the primary flow;
   mixing the secondary flow with the primary flow;
   inducing the shockwave flow structure at least partially in the primary flow; and
   igniting the fuel and air mixture based on a presence of the shockwave flow structure.

15. The method of igniting combustion as claimed in claim 14, wherein the method further comprises:
   inducing the shockwave flow structure by virtue of the convergent-divergent nozzle.

16. The method of igniting combustion as claimed in claim 14, wherein inducing the shockwave flow structure includes creating a region of high temperature gradient.

* * * * *